May 6, 1958 R. KOLLGAARD 2,833,615
ABATEMENT OF SMOG IN FLUE GASES
Filed Oct. 3, 1952
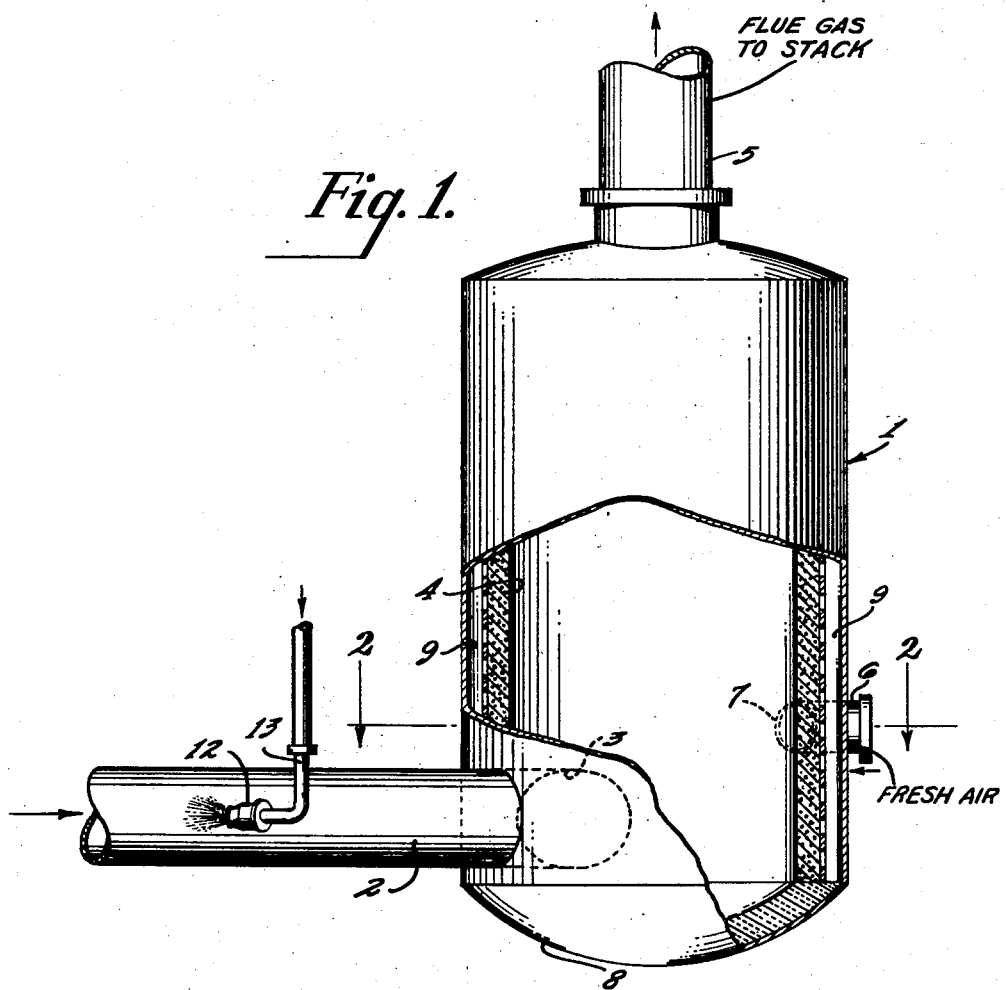
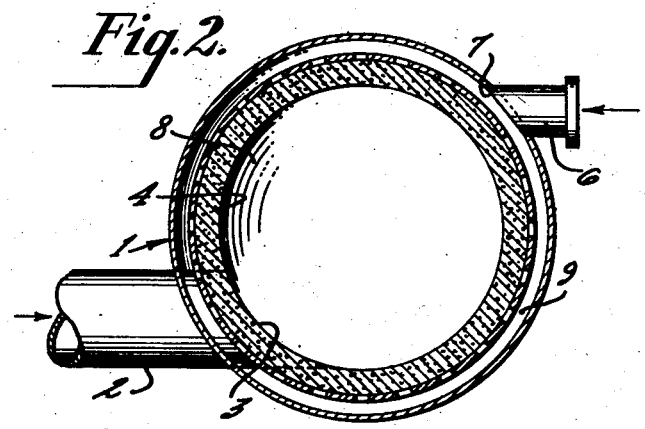
INVENTOR.
Reyner Kollgaard
BY
ATTORNEY United States Patent Office 2,833,615
Patented May 6, 1958

2,833,615

ABATEMENT OF SMOG IN FLUE GASES

Reyner Kollgaard, San Rafael, Calif., assignor to Houdry Process Corporation, Wilmington, Del., a corporation of Delaware Application October 3, 1952, Serial No. 312,953

4 Claims. (Cl. 23—2)

This invention relates to the abatement of the smogging characteristics of flue gases and more particularly relates to the elimination of smog in flue gases from combustion of carbonaceous and hydrocarbonaceous fuels. More specifically this invention is concerned with flue gases containing hydrocarbons having a relatively high dew point.

The problem of atmospheric pollution by dispersal therein of a wide variety of substances including carbon monoxide, atomized oily particles, various soots, ashes, sulfur compounds, and the like has been recognized relatively recently as a matter for general concern. Reasons for such concern are sound in that such pollution may have annoying or grievous effects on plant or animal life as well as to human beings and their possessions. A considerable amount of time and effort has been directed to means whereby such pollution may be abated. Various treatments are effective for various types of atmospheric polluting conditions; however, not any one treatment method has been completely successful in abating all of these conditions. Therefore, a considerable amount of specialization has been made in connection with the various problems of atmospheric pollution.

This invention is directed to the field concerned with flue gases or vapors or combustion fumes, hereinafter referred to as flue gases, particularly flue gases of the type wherein there is apt to be no appreciable free oxygen and greater or lesser amounts of uncombusted oil having fairly high dew point. Such flue gases resulting from the combustion of carbonaceous and hydrocarbonaceous materials such as coal, petroleum oils, shale oils or the like may, as the result of the conditions of combustion, be delivered to the stack, flue or chimney in such condition that small amounts of residual carbonaceous material are contained therein, which small amounts for reasons such as temperature conditions and the lack of sufficient quantities of oxygen are not oxidized but passed with the flue gases into the atmosphere in a state of extremely fine dispersion. It is the opinion of many investigators in the field of atmospheric pollution that the so-called smog is a combination of many things including dusts and very fine particles of hydrocarbons, for example, and that the elimination of such hydrocarbon particles from the air will reduce to considerable extent the tendency in the atmosphere to form such smog.

In accordance with this invention high temperature gases removed from the combustion zone in which carbonaceous and hydrocarbonaceous fuels are subjected to oxidation in the presence of a combustion supporting gas such as air, are treated in suitable manner to reduce the temperature thereof to that below the dew point of residual heavy hydrocarbonaceous materials contained therein and are thereafter introduced into a special cylindrical combustion zone. This combustion zone is provided with a combustion catalyst disposed around the inner periphery thereof and the gases are introduced tangentially in the zone for the purpose of selectively distributing, as a result of the centrifugal forces thus applied, the small particles contained in the gases against the combustion catalyst. A combustion-supporting gas of sufficient oxygen content is supplied adjacent the catalyst zone, thereby effecting ready combustion of such particles. Carbon monoxide will also be oxidized to a marked extent. The effluent gases from the special combustion chamber are thus substantially freed of unburned carbonaceous and hydrocarbonaceous materials that would otherwise tend to produce smog.

A more complete understanding of the invention will be had by reference to the accompanying sheet of drawings illustrating an embodiment thereof, read in connection with the detailed description which follows:

In the drawing,

Figure 1 is an elevational view, partly in section, of a supplemental combustion chamber of the type suitable for the practice of this invention.

Figure 2 is a cross-sectional view of the apparatus shown in Figure 1 taken on the line 2—2.

Referring more particularly to the system illustrated in Figure 1, there is shown a cylindrical vessel 1 provided with a flue gas inlet line 2 tangentially entering vessel 1 at 3. Supported on the internal wall of vessel 1 is a continuous pattern of combustion catalyst 4 which extends substantially the full vertical height of vessel 1 and thus presents a substantially complete internal wall-like member having the characteristics of catalyzing combustion. An exhaust line 5 is suitably positioned at the upper end of vessel 1 and is in communication either directly with the atmosphere or with suitable means (not shown) such as a chimney, stack or the like through which the gases exhausted from vessel 1 may be discharged into the atmosphere. Fresh air in combustion supporting amounts is admitted to vessel 1 through line 6 and port 7. The lower end of vessel 1 is suitably closed as with an insulated bottom head as shown at 8.

As shown in Figure 1 and in line 2, there is nozzle member 12 suitably connected to inlet line 13 whereby the temperature of the incoming gases may be suitably controlled as described more fully hereinafter.

As a typical embodiment, effluent gas from a combustion zone such as an oil furnace or other type (not shown), enters line 2 at relatively high temperature and passes therethrough. In so doing it is contacted with a stream of water or other cooling fluid introduced through line 13 and nozzle 12 whereby the temperature of the flue gas in line 2 is reduced to below the dew point of substantially all of the hydrocarbonaceous residue in such flue gas. Typical temperature of the uncooled flue gas ranges between 800° to 1200° F. or higher and after cooling may be of the order of 650° to 750° F. While one method of cooling the effluent from a combustion zone has been shown and described it is to be understood that other methods of cooling may be employed. Thus indirect heat exchangers, preheaters, or the like may be employed to obtain the desired temperature.

The thus cooled gases continue through line 2 and pass through port 3 tangentially into the combustion chamber 1 wherein as a result of the tangential introduction thereof such gases have circular motion imparted thereto and under the influence of such circular motion a centrifugal effect on entrained liquid particles therein projects such particles outwardly into contact with the combustion catalyst 4 supported adjacent to the walls of vessel 1. Combustion supporting amounts of fresh air are introduced through line 6 and port 7 into the lower region of vessel 1 for admixture with the gases in vessel 1 whereby the hydrocarbonaceous material contacting the combustion catalyst at moderately elevated temperatures are consumed to carbon dioxide and water vapor, which thereafter pass in admixture with all of the gases to the effluent line 5 for ultimate disposal into the atmosphere as through some suitable stack arrangement.

In the preferred embodiment shown in the drawing, the air entering through line 6 and port 7 enters annular space 9 between the outer wall of vessel 1 and the catalyst 4. Catalyst 4 in this instance is of permeable nature such that the air thus introduced passes inwardly through catalyst 4 into contact at the inner face thereof with such combustible material projected thereagainst by centrifugal action as previously described. Other methods of bringing such air into contact with the combustibles at the catalyst region are practical and such method may be adopted as operating circumstances and the nature of the equipment indicate.

Typical combustion catalysts for use in the wall location of vessel 1 as shown at 4 include the such known agents active in catalyzing combustion reactions as chromium or platinum and may be present as thin sheets, agglomerated fine particles as of the type obtained in the practice of powder metallurgy, or may be disposed in some suitable dispersed arrangement on the surface of a suitable support material such as ceramics of zirconia or alumina. Inasmuch as relatively small amounts of such catalyzing agents are required in such a combustion chamber even the more expensive materials such as the noble metals may be employed.

The temperature of the incoming gas to the combustion chamber, the temperature condition of wall 4, and the temperature of the fresh air admitted through port 7 should be sufficiently high that combustion of carbonaceous material including carbon monoxide is substantially immediately obtained upon contact with the catalyzing material. In general this temperature will be in the order of 600° F. and upwards, and inasmuch as it is desirable to have any higher molecular weight hydrocarbonaceous material in liquid form (as hereinabove described in connection with the lowering of the temperature of the flue gas to a temperature below the dew point of the higher molecular weight hydrocarbons) preferred temperatures should not exceed 850° F. at about the point of introduction.

This method of treatment of flue gases is of particular value in connection with certain hydrocarbon refining processes, particularly of the moving catalyst cracking systems wherein cracking catalyst is contacted with high molecular weight hydrocarbons at elevated temperatures to effect the cracking thereof. Such catalytic materials in so doing are inactivated by a deposit of hydrocarbonaceous material thereon, and after a purging treatment, are passed to a regeneration zone wherein under the influence of an oxidizing gas such hydrocarbonaceous deposit is combusted and removed. The purging treatment while generally efficient does not necessarily remove from the catalyst all of the moderately volatile hydrocarbonaceous material contained thereon with the result that when such catalyst enters the regeneration zone it contains a mixture of non-volatile hydrocarbons and some moderately volatile hydrocarbons. The regeneration of such catalyst being an exothermic reaction results in an increase in the temperature of the incoming catalyst with the resultant distillation therefrom of some of the more volatile hydrocarbonaceous components of the deposit.

Inasmuch as the oxygen content of the oxidizing gas is considerably reduced and may have been substantially exhausted before reaching this region of distillation, the distilled hydrocarbons become admixed with such relatively inert gas and combustion is not obtained. When such combustion gas and admixed oil vapors are discharged directly into the atmosphere there is a resultant condensation of the hydrocarbonaceous components resulting in a smog of such materials which spreads throughout the atmosphere with undesirable aspects. However, when such oxygen-deficient gases with the admixed oil vapors are treated in accordance with this invention and passed through the supplemental combustion chamber of this invention, the combustion of the oil vapors is obtained as hereinabove described. As a result, the flue gases may be discharged to the atmosphere without untoward results.

This system of invention is suitable for use in connection with oil fired furnaces, powdered coal fired furnaces and other combustion sources wherein the products of combustion are apt to contain relatively pure carbon and/or high molecular weight hydrocarbonaceous components in an uncombusted form.

Obviously many modifications and variations of the invention as hereinbefore set forth may be made without departing from the spirit and scope thereof, and therefore only such limitations should be imposed as are indicated in the appended claims.

What is claimed is:

1. The method of treating hot, substantially oxygen-free flue gas derived from the combustion of carbonaceous and hydrocarbonaceous materials, and containing smog-forming contaminants including residual non-combusted hydrocarbonaceous material having a relatively high dew point and finely-divided solid carbonaceous material which comprises the steps of: pre-cooling said flue gas to a temperature below the dew point of said residual hydrocarbonaceous material to thereby condense said hydrocarbonaceous material into a fine dispersion of liquid particles; introducing the cooled flue gas into one end of a confined cylindrical combustion zone having a peripheral permeable envelope of combustion catalyzing material, while imparting to said flue gas a whirling motion adapted to centrifugally concentrate said carbonaceous material and said condensed hydrocarbonaceous material at the surface of the catalyst envelope; introducing oxygen-containing gas into a confined annular zone surrounding said catalyst envelope; passing said oxygen-containing gas through the entire envelope of permeable catalyst into said combustion zone, thereby effecting a combustion of the centrifugally-separated heavier particles of carbonaceous and hydrocarbonaceous materials in the peripheral region of said combustion zone; and venting the treated flue gas stream from the other end of said combustion zone.

2. The method as defined in claim 1 in which said precooling of the incoming flue gas stream is effected prior to its introduction into said combustion zone by direct heat exchange with water introduced as a spray into the stream of flue gas.

3. The method as defined in claim 1 wherein said flue gas is precooled to a temperature in the range of 600 to 750° F.

4. The method as defined in claim 1 wherein said whirling motion is imparted to said flue gas by introducing the precooled flue gas stream tangentially into said combustion zone, whereby said heavier particles of carbonaceous and hydrocarbonaceous are caused to flow along a helical path in passing through said cylindrical combustion chamber.

References Cited in the file of this patent

UNITED STATES PATENTS

| | | |
|---|---|---|
| 1,824,078 | Fischer | Sept. 22, 1931 |
| 1,843,999 | White | Feb. 9, 1932 |
| 1,953,120 | Miller | Apr. 3, 1934 |
| 1,960,608 | Weber et al. | May 29, 1934 |
| 1,985,713 | Bartlett | Dec. 25, 1934 |
| 2,021,690 | Kaufman | Nov. 19, 1935 |
| 2,106,910 | Finn | Feb. 1, 1938 |
| 2,308,059 | Decker | Jan. 12, 1943 |
| 2,330,664 | Bennett | Sept. 28, 1943 |
| 2,431,632 | Brandt | Nov. 25, 1947 |
| 2,436,282 | Bennett | Feb. 17, 1948 |

FOREIGN PATENTS

| | | |
|---|---|---|
| 338,933 | Great Britain | Nov. 24, 1930 |
| 413,967 | Great Britain | July 26, 1934 |